No. 870,561. PATENTED NOV. 12, 1907.
E. JOSE.
WAGON BOX AND HAY RACK REMOVER.
APPLICATION FILED JAN. 7, 1907.
2 SHEETS—SHEET 1.
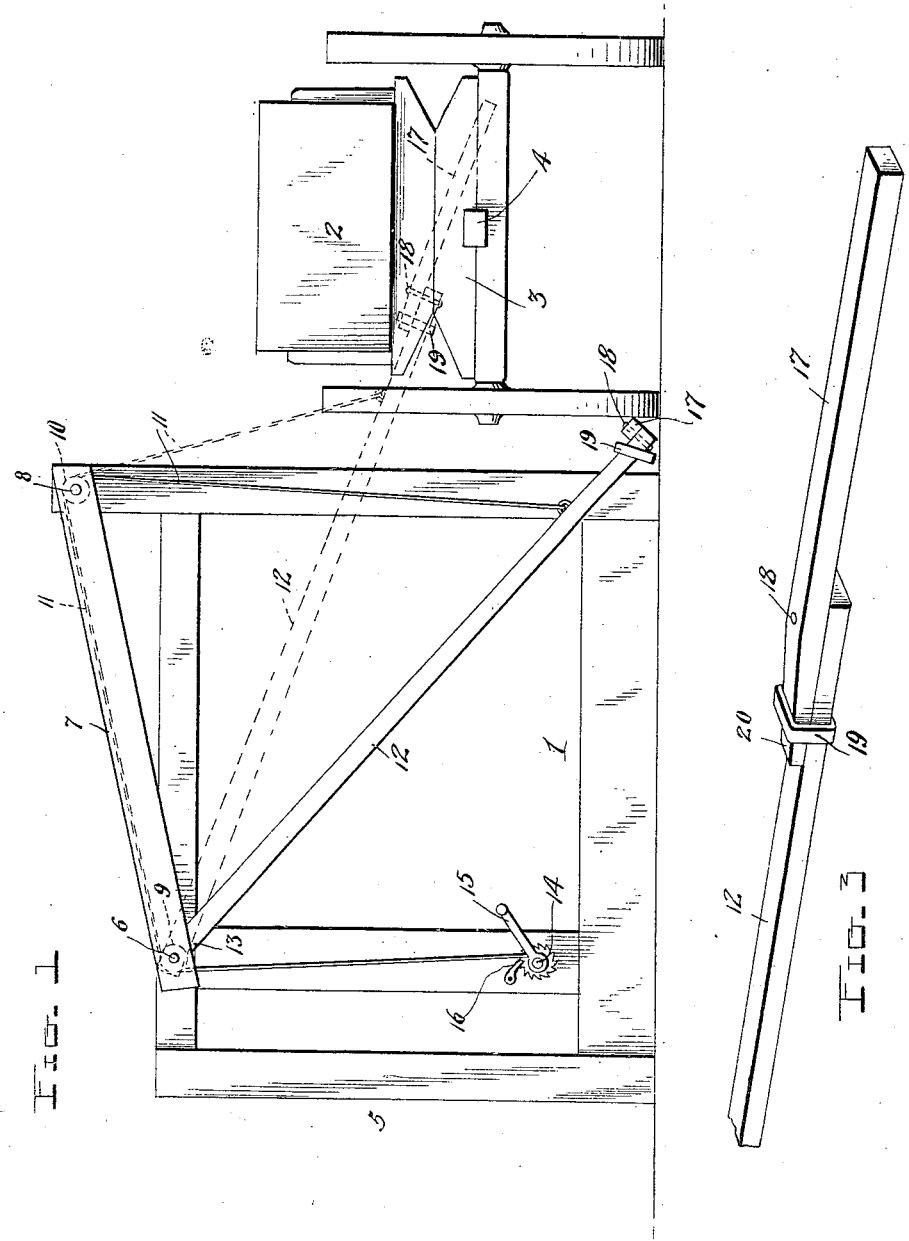

No. 870,561. PATENTED NOV. 12, 1907.
E. JOSE.
WAGON BOX AND HAY RACK REMOVER.
APPLICATION FILED JAN. 7, 1907.
2 SHEETS—SHEET 2.
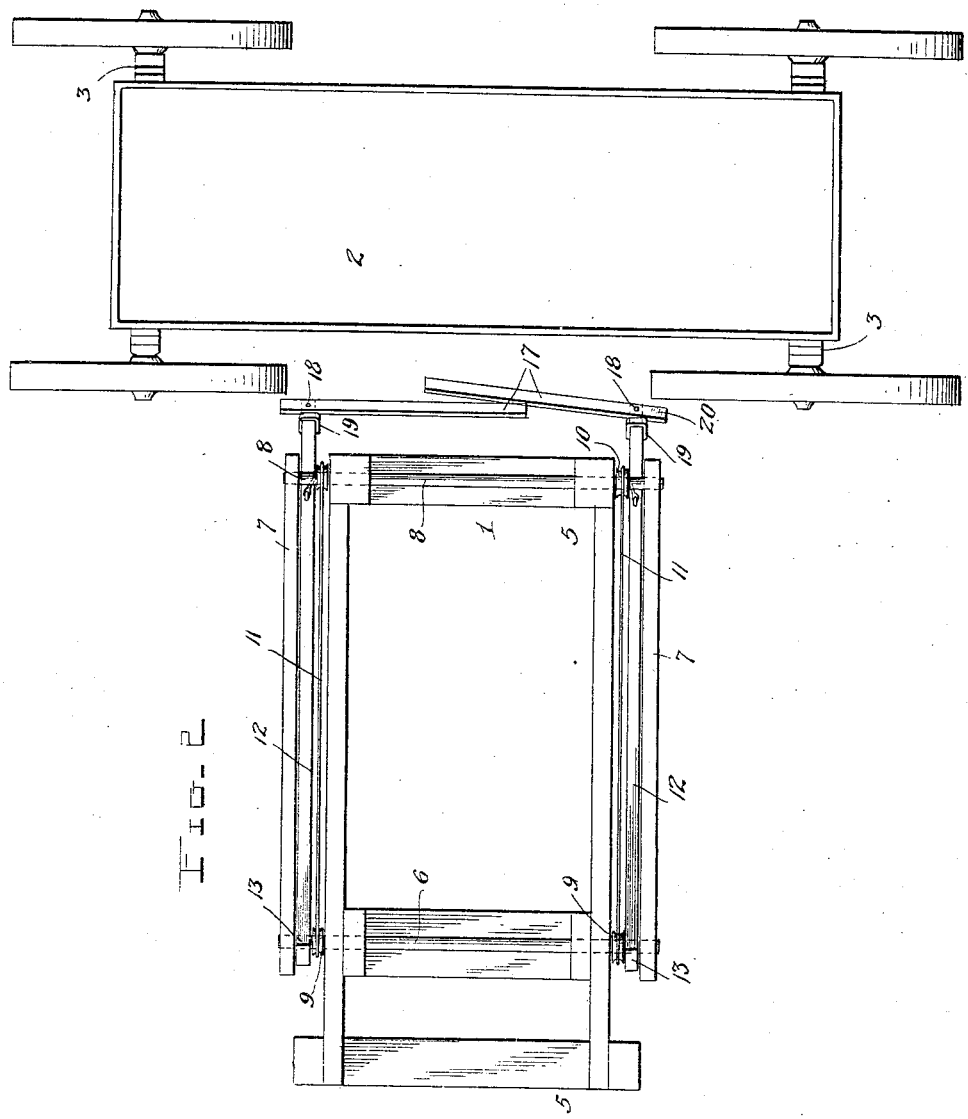

UNITED STATES PATENT OFFICE.

EDWARD JOSE, OF HARRISVILLE, WEST VIRGINIA.

WAGON-BOX AND HAY-RACK REMOVER.

No. 870,561. Specification of Letters Patent. Patented Nov. 12, 1907.

Application filed January 7, 1907. Serial No. 351,170.

*To all whom it may concern:*

Be it known that I, EDWARD JOSE, a citizen of the United States, residing at Harrisville, in the county of Ritchie and State of West Virginia, have invented certain new and useful Improvements in Wagon-Box and Hay-Rack Removers, of which the following is a specification, reference being had therein to the accompanying drawing.

My invention relates to improvements in devices for removing hay racks and wagon boxes from their running gears, and its object is to provide a device of this character which will be of simple and inexpensive construction, convenient to operate and well adapted to the purpose intended.

Further objects and advantages of the invention, as well as the structural features by means of which these objects are attained, will be made clear by an examination of the following specification, taken in connection with the accompanying drawings, in which, Figure 1 is a side elevation of my improved wagon box and hay rack remover; Fig. 2 is a top plan view of the same: and Fig. 3 is a detail perspective of one of the extensible elevating arms or levers.

Referring to the drawings by numeral 1 denotes my improved elevating or hoisting device for raising the hay rack, wagon box or the like 2 from the running gear 3 of a wagon. This running gear is of the usual form consisting of front and rear axles connected by a reach bar or pole 4. The device 1 comprises a frame 5 adapted to rest upon the ground or other suitable support, and as shown, consisting of two upright side sections connected by suitable cross beams. Mounted in the upper rear portion of the frame 5 is a transversely extending, stationary bar or shaft 6 which has its opposite ends projecting through the side sections of the frame and strengthened by upwardly and forwardly inclined braces 7 which latter have their forward ends similarly connected to the projecting ends of another transverse bar or shaft 8 arranged in the upper front portion of the frame. Upon the projecting ends of the shafts 6, 8 are mounted guide pulleys 9, 10 over which are passed hoisting cables or other flexible elements 11 which are adapted to elevate a hay rack or wagon box engaging frame consisting of two arms or levers 12. One of the levers 12 is arranged upon the outer side of each of the side sections of the frame and its rear end 13 is fulcrumed upon one of the extended ends of the shafts 6 adjacent to one of the pulleys 9. The forward ends of the cables 11 are secured to the levers 12 adjacent to their front ends, and the rear ends of the cables are attached to and wound upon the opposite ends of a transverse winding shaft 14 arranged in the lower rear portion of the frame 5. A crank handle 15 is provided upon one end of the shaft 14 and the usual pawl and ratchet device 16 may be provided for preventing retrograde movement of the shaft 14 and thus hold the levers 12 elevated. In order to enable the levers 12 to be inserted between the bottom of the wagon box, hay rack or the like 2, and the top of the reach or pole 4 of the wagon, I provide each of said levers or arms with an extensible section 17. This extensible section may be of any desired form and construction but, as shown, it is pivoted at 18 upon the outer end of the lever 12, so that it may be swung at right-angles to said lever, as shown in full lines in Figs. 1 and 2. When swung into longitudinal alinement with the lever, as shown in dotted lines in Fig. 1, and in full lines in Fig. 3, it is held rigidly in such position, preferably, by sliding a band or loop 19 over the beveled rear end 20 of the extension bar or section 17. The band 19 slides freely upon the lever 12 and is of such size that it may be wedged tightly upon the beveled or wedge-shaped end 20 of the bar 17 to rigidly fasten the latter to the lever. It will be understood that any other suitable means may be provided for holding the bar 17 in longitudinal alinement with the lever 12.

The operation of the device is as follows; The wagon with its body, hay rack or the like 2 thereon, is driven in front of the frame 5 when the levers 12 are in their lowered position, as shown in full lines in Fig. 1, and when the extension bars or sections 17 are swung inwardly at right-angles to the levers. The crank 15 is then turned to wind the cable 11 upon the shaft 14, until the levers 12 are elevated to the position shown in dotted lines in Fig. 1. When in this position their outer ends are disposed slightly above the reach 4 and beneath the body 2. The extension bars 17 are then swung outwardly into longitudinal alinement with the levers 12 and secured in such positions by slipping the bands 19 over their tapered ends 20. The crank 15 is then again turned to elevate the levers to a higher position whereupon the front ends of said levers and their extensions 17 will hoist the wagon body, hay rack or the like 2 from the running gear 3. Thus it will be seen that a wagon box, hay rack or other load upon the wagon may be quickly raised from the same or its running gear and held elevated until it is desired to again lower it upon the wagon or running gear.

The device is of simple, strong, durable and comparatively inexpensive construction and it is convenient and easy to operate.

Having thus described my invention, what I claim as new and desire to secure by Letters Patent of the United States, is:—

1. A device for raising wagon boxes, racks or the like, having a hoisting element provided with a swinging extension pivotally mounted to permit it to be swung between the reach or pole and the box or rack of a wagon or the like, substantially as described.

2. A device for raising wagon boxes, racks or the like, having a swinging element, and a pivotally mounted extensible section upon said element to permit it to be swung between the reach and the wagon box or rack of a wagon or the like, substantially as described.

3. A device for raising wagon boxes, racks or the like, having a swinging element, a pivotally mounted extensible section upon said element to permit it to be swung between the reach and the wagon box of a wagon or the like, and means for operating said swinging element, substantially as described.

4. A device of the character described, comprising a support, a lever pivoted thereon, an extensible section pivotally mounted upon said lever to permit it to be swung between the reach and the body or box of a wagon or the like, means for holding said section extended, and means for raising and lowering said lever, substantially as described.

5. A device of the character described, comprising a support, a lever pivoted thereon, an extensible section pivotally mounted upon said lever and adapted to be swung between the reach and the box or rack of a wagon or the like, and means for operating said lever, substantially as described.

6. A device of the character described, comprising a frame, a pair of levers concentrically pivoted thereon, extensible sections pivoted upon the front ends of said levers, and adapted to be swung between the reach and the box or rack of a wagon or the like, cables attached to said levers, guides for said cables, and means for winding and unwinding said cables, substantially as described.

7. In a hoisting device, a hoisting element mounted for vertical swinging movement, an extensible member pivoted upon said hoisting element and a slidable endless band carried by said hoisting element and adapted to engage said slidable member to hold it in extended position.

8. In a hoisting device, a hoisting lever, an extensible arm pivoted intermediate its ends upon said lever and adapted to be swung into longitudinal alinement therewith and a sliding band upon said lever to engage the short inner end of said arm and retain the latter in alinement with said lever.

In testimony whereof I hereunto affix my signature in presence of two witnesses.

EDWARD JOSE.

Witnesses:
L. I. LITTLE,
H. B. CAMPBELL.